United States Patent
Hartman (10) Patent No.: US 12,543,073 B2
(45) Date of Patent: Feb. 3, 2026

(54) SYSTEMS AND METHODS FOR LOAD BALANCING DEVICES CONNECTED TO A BASE STATION VIA A NETWORK REPEATER

(71) Applicant: Verizon Patent and Licensing Inc., Basking Ridge, NJ (US)

(72) Inventor: Robert J. Hartman, Plainfield, NJ (US)

(73) Assignee: Verizon Patent and Lic ensing Inc., Basking Ridge, NJ (US)

( * ) Notice: Subject to any disclaimer, the term of this patent is extended or adjusted under 35 U.S.C. 154(b) by 681 days.

(21) Appl. No.: 17/804,632

(22) Filed: May 31, 2022

(65) Prior Publication Data
US 2023/0388855 A1   Nov. 30, 2023

(51) Int. Cl.
*H04W 28/08* (2023.01)
*H04W 28/02* (2009.01)
*H04W 28/086* (2023.01)
*H04W 76/15* (2018.01)

(52) U.S. Cl.
CPC ... *H04W 28/0862* (2023.05); *H04W 28/0284* (2013.01); *H04W 76/15* (2018.02)

(58) Field of Classification Search
None
See application file for complete search history.

(56) References Cited

U.S. PATENT DOCUMENTS

| | | | | |
|---|---|---|---|---|
| 2014/0105136 | A1* | 4/2014 | Tellado | H04L 5/0058 370/329 |
| 2022/0132435 | A1* | 4/2022 | Alam | H04W 52/283 |
| 2023/0155711 | A1* | 5/2023 | Zhang | H04W 72/541 455/63.1 |

OTHER PUBLICATIONS

Co-pending U.S. Appl. No. 17/120,867, entitled "Systems and Methods for Autonomously Configuring Fifth Generation (5G) Network Repeaters," by Robert J. Hartman et al., filed Dec. 14, 2020, 38 pages.

* cited by examiner

*Primary Examiner* — Kouroush Mohebbi (57) ABSTRACT

In some implementations, a device may obtain load information indicating a load of a first base station, wherein the load is associated with devices connected to the first base station. The device may determine that the load satisfies a load threshold of the first base station. The device may determine that a network repeater is connected to the first base station. The device may determine that a plurality of devices are connected to the network repeater. The device may determine that the network repeater is capable of connecting to a second base station. The device may cause the network repeater to connect to the second base station to reduce the load based on: the load satisfying the load threshold, the plurality of devices being connected to the network repeater, and the network repeater being capable of connecting to the second base station.

20 Claims, 8 Drawing Sheets

SYSTEMS AND METHODS FOR LOAD BALANCING DEVICES CONNECTED TO A BASE STATION VIA A NETWORK REPEATER

BACKGROUND

A network repeater or a network extender (referred to hereinafter as a network repeater) can be used to densify a network and provide coverage to areas where there may have been poor radio frequency (RF) coverage. Thus, network repeaters may add network density in terms of coverage, but not in terms of physical infrastructure.

DETAILED DESCRIPTION OF PREFERRED EMBODIMENTS

The following detailed description of example implementations refers to the accompanying drawings. The same reference numbers in different drawings may identify the same or similar elements.

Network repeaters may be used to extend coverage of millimeter wave signals since a free space path loss (FSPL) of frequencies in the millimeter wavelength may be much higher than that used in other wireless communication networks. Network repeaters may be a preferred choice of extending network coverage since network repeaters do not need backhaul nor require an expensive installation process as that of a base station. Network repeaters may utilize beam steering technology and, when deployed, may require information, such as, power detection information (e.g., a received signal strength indicator (RSSI), a reference signal received power (RSRP), and/or the like), to ensure proper beam alignment from the network repeater to a base station (e.g., a 5G next generation NodeB, also referred to as gNB). The network repeaters may utilize the required information to commission and properly setup the correct beam from the network repeaters to the correct beam from the base station to establish the best possible connection.

A base station may be connected to a plurality of devices. In some instances, the plurality of devices may include a network repeater that is connected to multiple devices of a user. When a load of the base station exceeds a maximum load, the base station may disconnect from one or more devices of the plurality of devices. For example, the base station may drop a call. As a result of disconnecting, the one or more devices may experience poor network performance (e.g., experience jitter, packet loss, among other examples). In some instances, the one or more devices may attempt to re-establish a connection with the base station. Attempting to re-establish a connection consumes network resources, computing resources, among other examples.

Implementations described herein are directed to reducing a load of a first base station by causing a network repeater to be disconnected from the first base station and to be connected to a second base station. For example, based on determining that the load of the first base station is approaching a maximum load, a load management system may determine whether a network repeater is connected to the first base station. Based on determining that the network repeater is connected to the first base station, the load management system may determine a load of the network repeater and determine whether the network repeater is able to connect to the second base station. The load management system may cause the network repeater to disconnect from the first base station and to connect to the second base station to reduce the load of the first base station based on the load of the first base station, the load of the network repeater, and/or determining that the network repeater is able to connect to the second base station.

By causing the network repeater to connect to the second base station in this manner, the implementations described herein may prevent the load of the first base station from reaching the maximum load and, accordingly, prevent the first base station from being overloaded. As a result of preventing the first base station from being overloaded, the implementations described herein may prevent the first base station from disconnecting from one or more devices. By preventing the first base station from disconnecting from the one or more devices, the implementations described herein may prevent poor network performance. Additionally, by preventing the first base station from disconnecting from the one or more devices, the implementations described herein may preserve network resources, computing resources, and/or other resources that would been otherwise consumed in order to re-establish a connection with the first base station or any base station.

FIGS. 1A-1E are diagrams of an example implementation 100 associated with associated with load balancing devices connected to a base station via a network repeater. As shown in FIGS. 1A-1E, example implementation 100 includes a network repeater 105 (e.g., a 5G network repeater), an eNodeB (eNB) 110, multiple gNBs 115 (referred to herein individually as gNB 115 or collectively as gNBs 115), multiple devices 120 (referred to herein individually as device 120 or collectively as devices 120), a load management system 125, a base station data structure 130, and a network repeater data structure 135. These devices are described in more detail below in connection with FIG. 2 and FIG. 3.

Figure 1A:
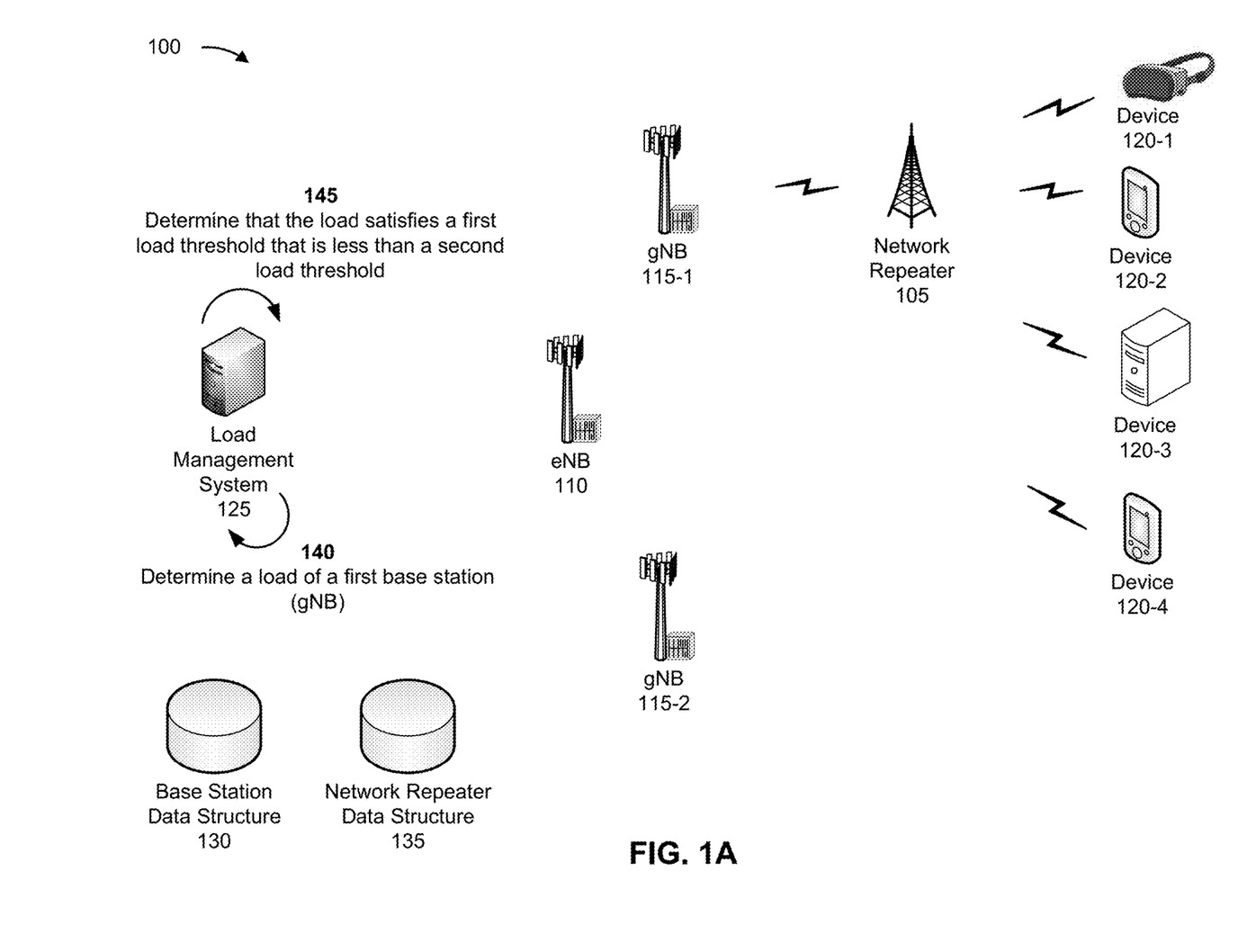
FIGS. 1A-1E are diagrams of an example associated with load balancing devices connected to a base station via a network repeater.

The network repeater 105 may include a device that focuses a wireless signal toward a receiving device (e.g., the eNB 110 or a gNB 115) to create a direct, fast, and reliable connection. For example, the network repeater 105 may include a network repeater (e.g., a device used to expand coverage of a network and/or to offset a cost of an additional eNB 110 and/or gNB 115), a dwelling repeater (e.g., a device used to extend mmWave coverage from outdoors to indoors), a commercial signal booster, an industrial signal booster, among other examples.

The network repeater 105 may utilize beam forming technology to establish a link with gNBs 115 to re-amplify and re-transmit mmWave communication signals. In this way, the network repeater 105 may extend the RF coverage of the gNB 115, which may be limited due to power, FSPL, building infrastructures, foliage, and/or other types of natural and/or man-made elements. Thus, the network repeater 105 may allow for network densification and expansion without the cost and overhead of additional base stations.

In some examples, the network repeater 105 may automatically attach to the eNB 110 or a gNB 115 when powered on. The network repeater 105 may include a communication component (e.g., a CAT M1 module, a CAT1 module, a CAT3 module, a CAT4 modules, a WiFi module, among other examples) and, when initially powered on, the network repeater 105 may utilize the communication component to connect to a network via a closest eNB or a closest gNB.

As shown in FIG. 1A, multiple devices 120 (referred to herein individually as device 120 or collectively as devices 120) may be connected to the network repeater 105. The devices 120 may include a device 120-1 (e.g., a virtual reality headset), a device 120-2 (e.g., a first user equipment (UE)), a device 120-3 (e.g., a customer premise equipment (CPE)), and/or a device 120-4 (e.g., a second UE). The network repeater 105 may be configured to enable devices 120 to establish a connection with the eNB 110 and/or one or more gNBs 115.

The eNB 110 may include one or more devices capable of transferring traffic, such as audio, video, text, and/or other traffic and may be associated with a Long Term Evolution (LTE) or fourth generation (4G) network. The gNB 115 may include one or more devices that support, for example, a cellular radio access technology (RAT) and wireless communication for the network repeater 105. In some implementations, multiple gNBs 115 may be connected to a same eNB. For example, as shown in FIG. 1A, the gNB 115-1 and the gNB 115-2 may be connected to the eNB 110. Alternatively, the gNB 115-1 and the gNB 115-2 may be connected to different eNBs.

The load management system 125 may include one or more devices that are configured to balance a load of a gNB 115 to reduce the load of the gNB 115, as explained in more detail below. In some implementations, the load of the gNB 115 may include a processing load of the gNB 115. Additionally, or alternatively, the load of the gNB 115 may include a radio frequency (RF) load of the gNB 115, a backhaul load of the gNB 115, among other examples. For example, the load management system 125 may determine the load of the gNB 115. Based on the load of the gNB 115, the load management system 125 may cause one or more network repeaters to be disconnected from the gNB 115 in order to prevent the load of the gNB 115 from reaching a maximum load of the gNB 115. In some implementations, the load management system 125 may be included in a gNB 115. Additionally, or alternatively, the load management system 125 may be included in a device that is part of a cloud computing environment. Additionally, or alternatively, the load management system 125 may be included in a multi-access edge computing (MEC) device. In some examples, the load management system 125 may be implemented as a self-optimizing network.

The base station data structure 130 may include a data structure (e.g., a database, a table, a list, and/or the like) that stores information regarding one or more eNBs (e.g., the eNB 110) and/or regarding one or more gNBs (e.g., the gNB 115-1, the gNB 115-2, among other examples). For example, the base station data structure 130 may store configuration information of the one or more eNBs and/or of the one or more gNBs. In some implementations, the configuration information of a gNB 115 may include information identifying the gNB 115, information identifying devices connected to the gNB 115, and/or load information indicating a load of the gNB 115 (e.g., a load associated with the devices connected to the gNB 115). In some examples, the devices connected to the gNB 115 may include one or more network repeaters (e.g., network repeater 105).

In some situations, the configuration information may be provided to the base station data structure 130 for storage by the gNB 115. Additionally, or alternatively, the configuration information may be provided to the base station data structure 130 for storage by the devices connected to the gNB 115. Additionally, or alternatively, the configuration information may be provided to the base station data structure 130 by one or more devices of a network associated with the gNB 115. In some implementations, the configuration information may be provided using an application program interface (API) (e.g., a representational state transfer (REST) API).

The network repeater data structure 135 may include a data structure (e.g., a database, a table, a list, and/or the like) that stores information regarding one or more network repeaters. The one or more network repeaters may include the network repeater 105. In some situations, the information regarding the one or more network repeaters may be provided by the one or more network repeaters. Additionally, or alternatively, the information regarding the one or more network repeaters may be provided by one or more devices of a network associated with the one or more network repeaters.

In some implementations, the information regarding the one or more network repeaters may be provided using an API (e.g., a REST API). In some situations, the information regarding the gNB 115-2 may be provided via 4G connectivity.

In some implementations, the network repeater data structure 135 may include information identifying the one or more network repeaters and connectivity information of the one or more network repeaters. The connectivity information may be stored in association with the information identifying the one or more network repeaters. In some examples, the connectivity information of the network repeater 105 may include information identifying a quantity of devices connected to the network repeater 105, information regarding an amount of data exchanged with the devices connected to the network repeater 105, base station information identifying one or more base stations (e.g., one or more gNBs 115) to which the network repeater may connect, beam information identifying one or more beam indexes associated with the one or more base stations, and/or signal information regarding one or more signals transmitted by the one or more base stations.

In the example described herein, the one or more base stations may include the gNB 115-1 and/or the gNB 115-2. The signal information may indicate a measure of signal strength and/or a measure of signal quality of the one or more signals. In some implementations, the network repeater 105 may generate the connectivity information during commissioning (or deployment) of the network repeater 105 and provide the connectivity information to the network repeater data structure 135 for storage. For example, during the commissioning (or deployment), the network repeater 105 may identify the one or more base stations (e.g., identify one or more base stations within a distance threshold of the network repeater 105).

The network repeater 105 may determine the signal information regarding the one or more signals transmitted by the one or more base stations (e.g., one or more mmWave communication signals). For example, the network repeater 105 may determine a reference signal received power (RSRP) of a signal received from the gNB 115-1, a signal to interference and noise ratio (SINR) of the signal received from the gNB 115-1 and received by the network repeater 105, among other examples. The network repeater 105 may perform similar actions with respect to a signal transmitted by the gNB 115-2.

In some situations, the network repeater 105 may rank the one or more base stations based on the signal information. For example, the gNB 115-1 may be ranked higher than the gNB 115-2 if the measure of signal strength of the signal received from the gNB 115-1 exceeds the measure of signal strength of a signal received from the gNB 115-2. Additionally, or alternatively, the gNB 115-1 may be ranked higher than the gNB 115-2 if the measure of signal quality of the signal received from the gNB 115-1 exceeds the measure of signal quality of the signal received from the gNB 115-2.

In some examples, the connectivity information may include information identifying a ranking of the one or more base stations based on the signal information. The information identifying the quantity of devices connected to the network repeater 105 may include information identifying a quantity of devices currently connected to the network repeater 105 during the commissioning (or deployment) of the network repeater 105.

In some implementations, after the commissioning (or deployment) of network repeater 105, the network repeater 105 may update the connectivity information and provide the updated connectivity information to the network repeater data structure 135 for storage. For example, the network repeater 105 may update the connectivity information periodically (e.g., every ten minutes, every thirty minutes, among other examples). Additionally, or alternatively, the network repeater 105 may update the connectivity information based on a trigger (e.g., based on a request from the load management system 125, based on a request from the one or more base stations, among other examples).

In the example that follows, the network repeater 105 may be connected to the gNB 115-1. In this regard, the devices 120 connected to the network repeater 105 may be connected to the gNB 115-1 via the network repeater 105. The network repeater 105 may be capable of connecting to one or more other base stations, such as the gNB 115-2.

As shown in FIG. 1A, and by reference number 140, the load management system 125 may determine a load of a first base station. In the example described herein, the first base station may be the gNB 115-1. In some implementations, the load management system 125 may obtain load information indicating the load of the gNB 115-1 and determine the load based on the load information. In some situations, the load management system 125 may obtain the load information from one or more memories associated with the gNB 115-1.

In some examples, the load information may include information identifying a quantity of devices connected to the gNB 115-1. Additionally, or alternatively, the load information may include information identifying an amount of data exchanged between the gNB 115-1 and the devices connected to the gNB 115-1. In this regard, the load management system 125 may determine the load of the gNB 115-1 based on the quantity of devices and/or based on the amount of data.

The load management system 125 may determine the load periodically (e.g., every minute, every ten minutes, every thirty minutes, among other examples). Additionally, or alternatively, the load management system 125 may determine the load based on a trigger (e.g., based on a request from one or more devices of the network associated with the gNB 115-1, based on determining the load of another base station, among other examples).

As shown in FIG. 1A, and by reference number 145, the load management system 125 may determine that the load satisfies a first load threshold that is less than a second load threshold. The second load threshold may indicate a maximum load of the gNB 115-1.

The first load threshold may be a device quantity threshold of devices connected to the gNB 115-1. Additionally, or alternatively, the first load threshold may be a data quantity threshold regarding an amount of data exchanged with devices connected to the gNB 115-1. The second load threshold may be a maximum quantity of devices that may be connected to the gNB 115-1. Additionally, or alternatively, the second load threshold may be a maximum amount of data to be exchanged with devices that may be connected to the gNB 115-1.

The load management system 125 may compare the load of the gNB 115-1 and the first load threshold. Based on comparing the load of the gNB 115-1 and the first load threshold, the load management system 125 may determine that the load of the gNB 115-1 satisfies the first load threshold. For example, the load management system 125 may determine that the quantity of devices connected to the gNB 115-1 satisfies the device quantity threshold. Additionally, or alternatively, the load management system 125 may determine that the amount of data (exchanged between the gNB 115-1 and the devices connected to the gNB 115-1) satisfies the data quantity threshold.

Figure 1B:
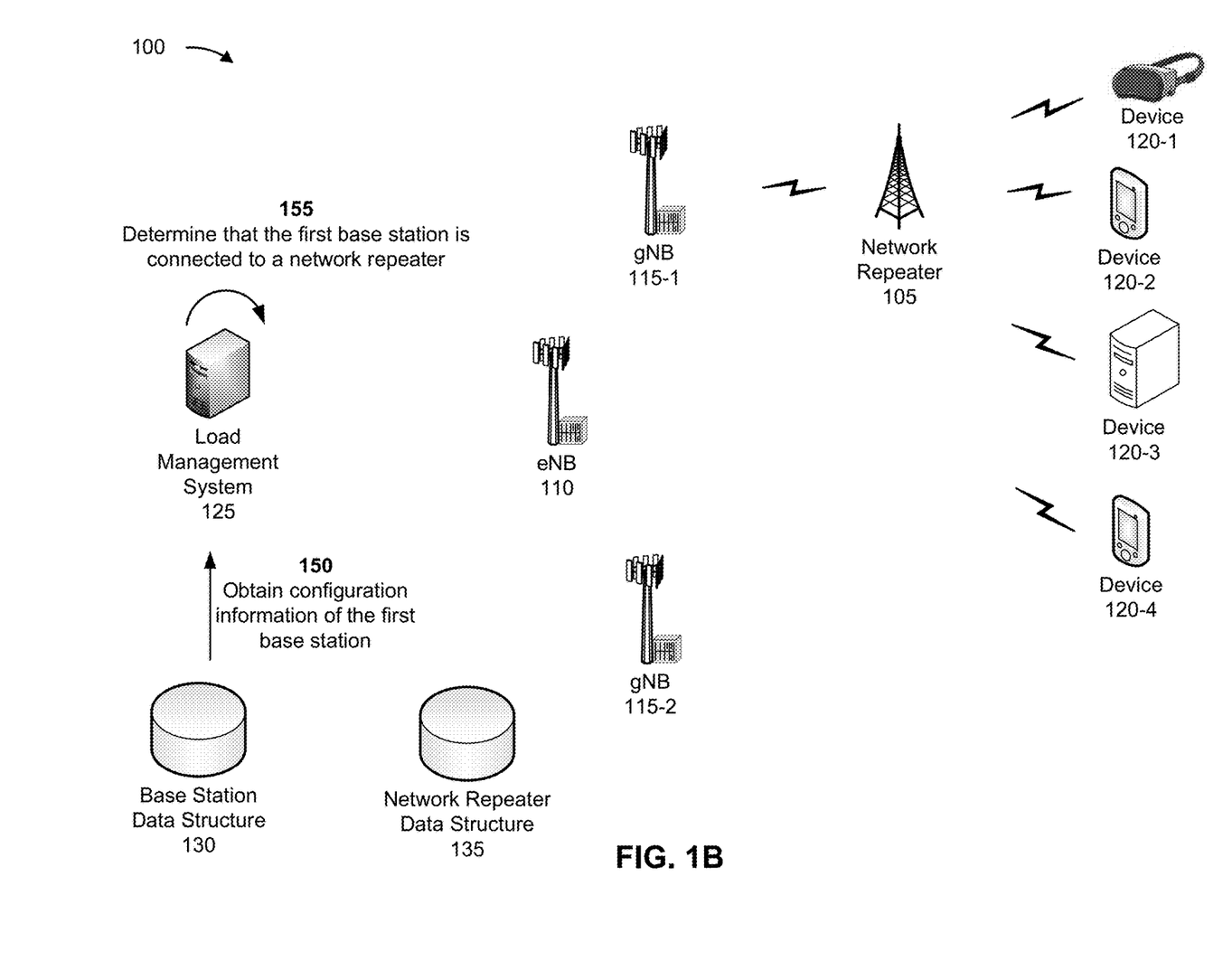

As shown in FIG. 1B, and by reference number 150, the load management system 125 may obtain configuration information of the first base station. For example, based on determining that the load satisfies the first load threshold, the load management system 125 may obtain the configuration information of the gNB 115-1 from the base station data structure 130. In some implementations, the load management system 125 may perform a lookup of the base station data structure 130 and obtain the configuration information of the gNB 115-1 from the base station data structure 130 based on the lookup. The lookup may be performed using information identifying the gNB 115-1, such as a physical cell identifier associated with the gNB 115-1. In the base station data structure 130, the configuration information of the gNB 115-1 may be associated with the information identifying the gNB 115-1. The configuration information of the gNB 115-1 may include information identifying the devices connected to the gNB 115-1.

As shown in FIG. 1B, and by reference number 155, the load management system 125 may determine that the first base station is connected to a network repeater. In the example described herein, the network repeater may be the network repeater 105. In some implementations, the load management system 125 may analyze the configuration of the gNB 115-1 and determine that the configuration information includes information identifying the network repeater 105. For example, the devices may include the network repeater 105, and the information identifying the devices may include the information identifying the network repeater 105.

In some examples, the load management system 125 may determine that the information identifying the network repeater 105 identifies a network repeater (e.g., based on a format of the information identifying the network repeater 105, based on content of the information identifying the network repeater 105, among other examples). The information identifying the network repeater 105 may include an international mobile equipment identity (IMEI), a mobile directory number (MDN), a service set identifier (SSID), among other examples.

In some situations, the gNB 115-1 may be connected to multiple network repeaters. In this regard, based on analyzing the configuration information, the load management system 125 may determine that the configuration information includes information identifying one or more additional network repeaters in a manner similar to the manner described above.

Figure 1C:
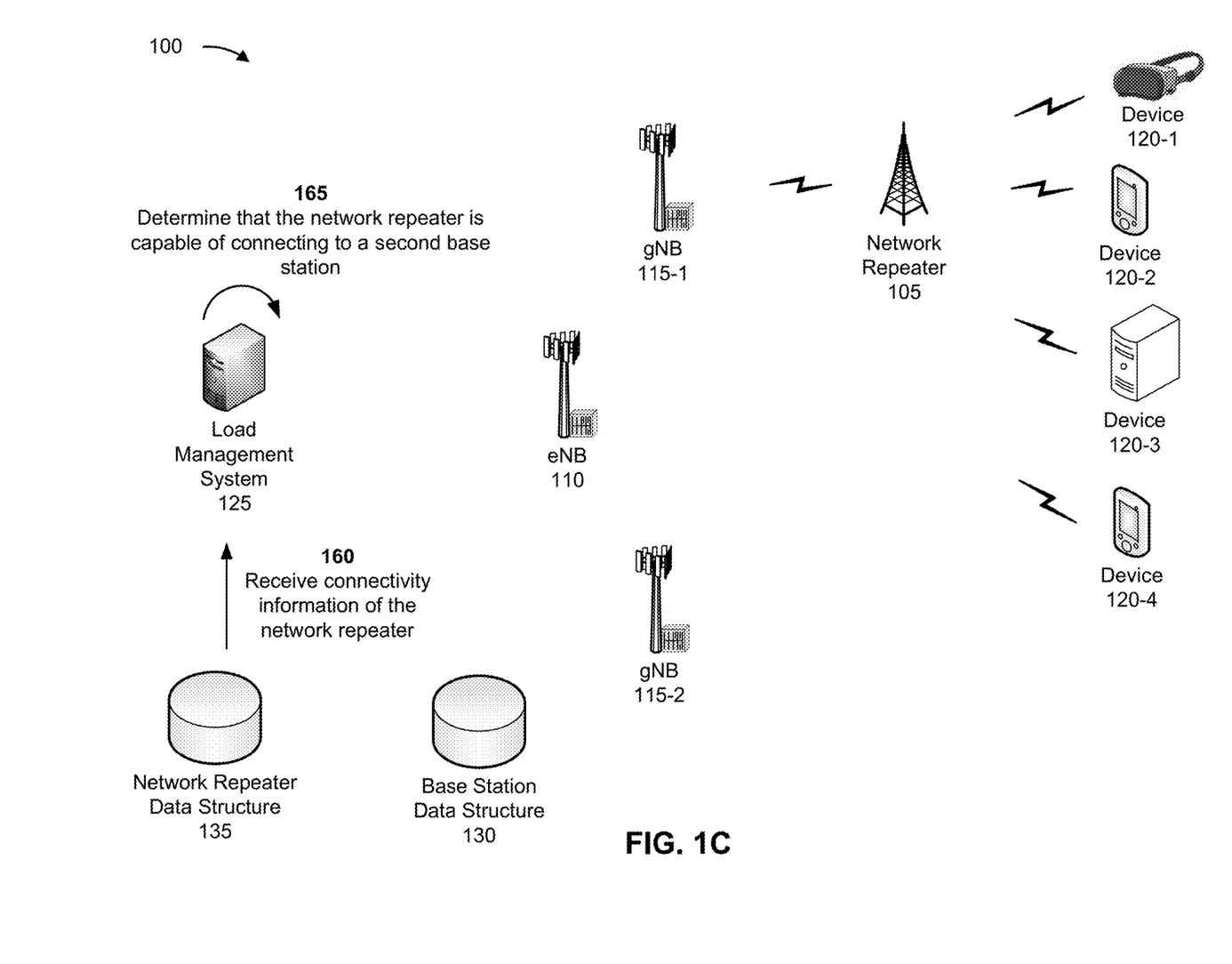

As shown in FIG. 1C, and by reference number 160, the load management system 125 may obtain connectivity information of the network repeater. For example, the load management system 125 may receive the connectivity information of the network repeater 105 from the network repeater data structure 135. In some implementations, based on determining that the gNB 115-1 is connected to the network repeater 105, the load management system 125 may perform a lookup of the network repeater data structure 135 and may obtain the connectivity information of the network repeater 105 from the network repeater data structure 135 based on the lookup. The lookup may be performed using the information identifying the network repeater 105.

The connectivity information of the network repeater 105 has been described above. In some examples, the information (included in the connectivity information) identifying the ranking of the one or more base stations may identify the gNB 115-1 as a primary base station for the network repeater 105, identify the gNB 115-2 as a secondary base station for the network repeater 105, information identifying a third base station (e.g., a third gNB 115) as a tertiary base station, and so on. The load management system 125 may attempt to cause the network repeater 105 to connect to the one or more base stations in an order that is based on the ranking of the one or more base stations.

As shown in FIG. 1C, and by reference number 165, the load management system 125 may determine that the network repeater is capable of connecting to a second base station. In the example described herein, the second base station may be the gNB 115-2. In some implementations, the load management system 125 may determine that the network repeater 105 is capable of connecting to the gNB 115-2 based on the connectivity information. For example, the load management system 125 may determine that the network repeater 105 is capable of connecting to the gNB 115-2 based on the connectivity information including the information identifying the gNB 115-2. In some situations, the load management system 125 may determine that the network repeater 105 is capable of connecting to one or more additional base stations in a similar manner.

Figure 1D:
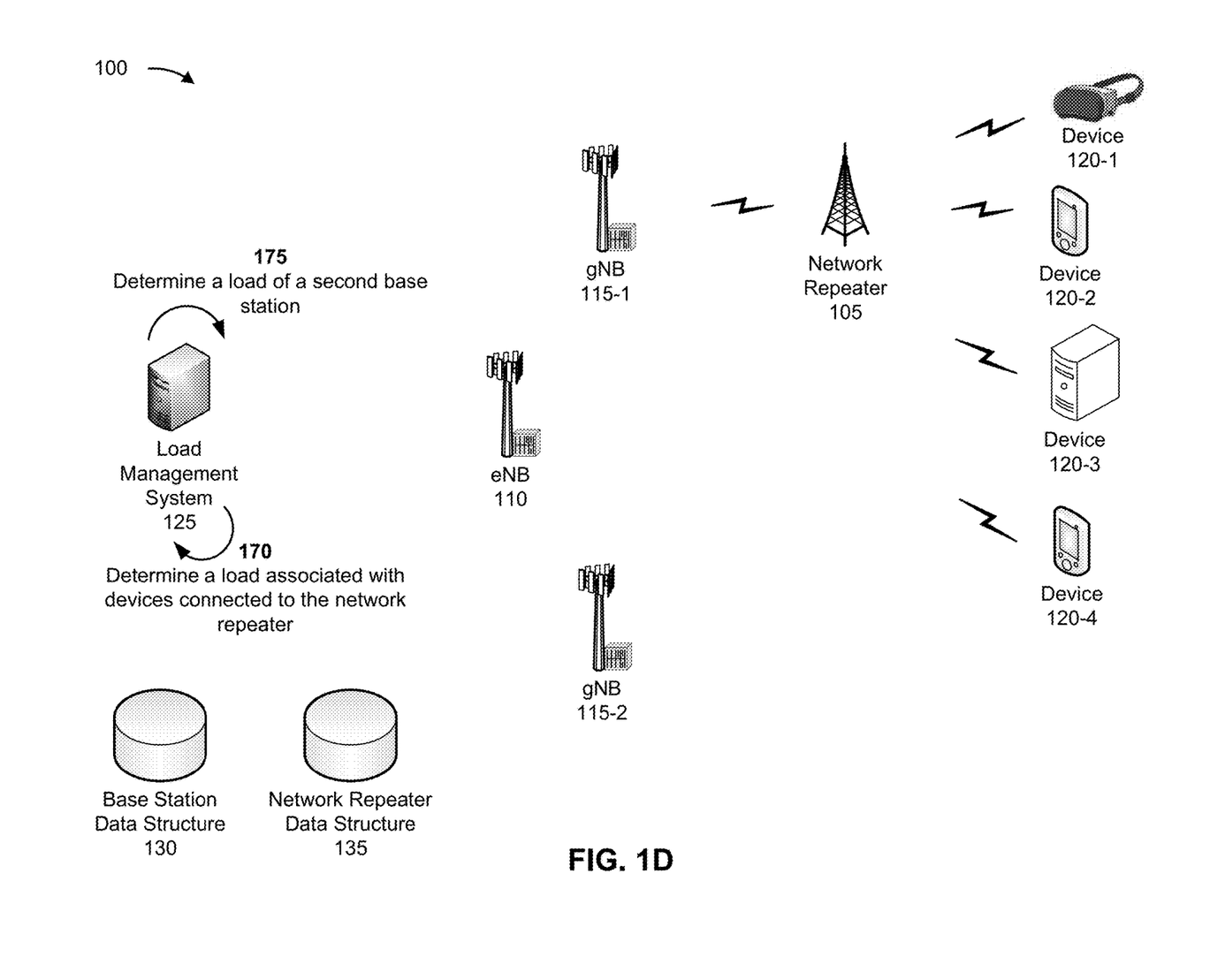

As shown in FIG. 1D, and by reference number 170, the load management system 125 may determine a load associated with devices connected to the network repeater. The load may be referred to as the load of the network repeater 105. In some implementations, the load management system 125 may determine the load of the network repeater 105 based on the connectivity information. For example, the load management system 125 may determine the quantity of devices connected to the network repeater 105 based on the information identifying the quantity of devices connected to the network repeater 105. Additionally, or alternatively, the load management system 125 may determine the amount of data based on the information regarding the amount of data exchanged with the devices connected to the network repeater 105. The load management system 125 may determine the load of the network repeater 105 based on the quantity of devices connected to the network repeater 105 and/or based on the amount of data exchanged with the devices connected to the network repeater 105 in a manner similar to the manner described above in connection with the load of the gNB 115-1.

In some implementations, the load management system 125 may predict the load of the network repeater 105 based on historical data regarding the load of the network repeater 105. In this regard, the load management system 125 may implement a machine learning model that is trained, based on the historical data, to predict the load of the network repeater 105. In some examples, the load management system 125 may obtain the historical data from the network repeater data structure 135. The network repeater data structure 135 may accumulate the historical data over a period of time. The historical data may identify historical loads of the network repeater 105, historical quantities of devices connected to the network repeater 105, historical amounts of data exchanged between the network repeater 105 and devices connected to the network repeater 105, among other examples. The load management system 125 may predict the load of the network repeater 105 using the historical data and one or more mathematical algorithms or operations.

For example, the load management system 125 may determine a minimum load of the historical data and predict the load based on the minimum load. Additionally, or alternatively, the load management system 125 may determine a maximum load of the historical data and predict the load based on the maximum load. Additionally, or alternatively, the load management system 125 may determine an average load of the historical data and predict the load based on the average load.

The load management system 125 may perform similar actions for one or more additional network repeaters connected to the gNB 115-1 to determine the load of the one or more additional network repeaters. In some situations, the load management system 125 may compare the load of the network repeater 105 and the load of the one or more additional network repeaters to identify a network repeater that is to be disconnected from the gNB 115-1 to reduce the load of the gNB 115-1. In some examples, the load management system 125 may identify a network repeater associated with a load that exceeds the load of all network repeaters connected to the gNB 115-1. For instance, the load management system 125 may determine that the load of the network repeater 105 exceeds the load of all network repeaters connected to the gNB 115-1.

The load management system 125 may determine that the load of the network repeater 105 causes the load of the gNB 115-1 to satisfy the first threshold load. For example, the load management system 125 may determine that the quantity of devices connected to the network repeater 105 and/or the amount of data (exchanged between the network repeater 105 and the devices connected to the network repeater 105) cause the load of the gNB 115-1 to satisfy the first load threshold. Based on determining that the load of the network repeater 105 causes the load of the gNB 115-1 to satisfy the first load threshold, the load management system 125 may determine that the network repeater 105 is to be disconnected from the gNB 115-1 and connected to another base station (e.g., the gNB 115-2) to prevent the load of the gNB 115-1 from satisfying the second threshold. In this regard, the load management system 125 may determine whether the gNB 115-2 can establish a connection with the network repeater 105.

In some situations, the load management system 125 may determine that multiple network repeaters are to be disconnected from the gNB 115-1. In this regard, the load management system 125 may identify one or more base stations identified by the connectivity information of the multiple network repeaters and determine whether the one or more base stations can establish a connection with the multiple network repeaters as described herein.

As shown in FIG. 1D, and by reference number 175, the load management system 125 may determine a load of a second base station. In the example described herein, the second base station may be the gNB 115-2. In some implementations, the load management system 125 may determine whether the gNB 115-2 can establish the connection with the network repeater 105 based on the load of the gNB 115-2. The load management system 125 may determine the load of the gNB 115-2 in a manner similar to the manner described above in connection with determining the load of the gNB 115-1.

After determining the load of the gNB 115-2, the load management system 125 may determine whether the load of the gNB 115-2 satisfies a third load threshold that is less than a fourth load threshold. The fourth load threshold may indicate a maximum load of the gNB 115-2. In some implementations, the third load threshold may be similar to the first load threshold and/or the third load threshold may be similar to the first load threshold. Alternatively, the third load threshold may be different than the first load threshold and/or the third load threshold may be different than the first load threshold.

If the load management system 125 determines that the load of the gNB 115-2 satisfies the third load threshold, the load management system 125 may determine whether a next base station (identified in the connectivity information of the network repeater 105) can establish a connection with the network repeater 105 based on a load of the next base station, in a manner similar to the manner described in connection with the gNB 115-2.

Figure 1E:
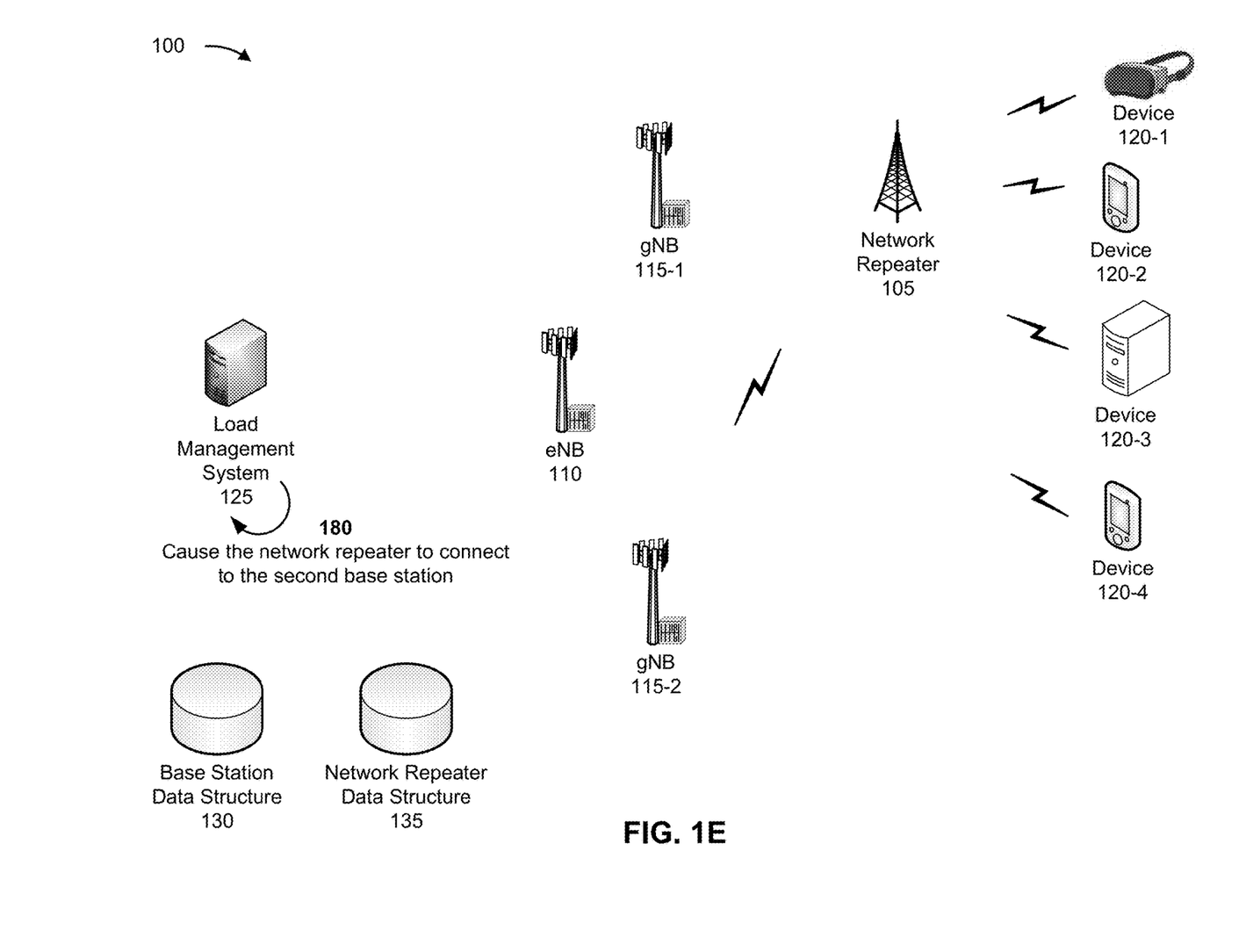

As shown in FIG. 1E, and by reference number 180, the load management system 125 may cause the network repeater to connect to the second base station. For example, the load management system 125 may determine that the load of the gNB 115-2 does not satisfy the third load threshold. Based on determining that the load of the gNB 115-2 does not satisfy the third load threshold, the load management system 125 may determine whether the load of the network repeater 105 will cause the load of the gNB 115-2 to satisfy the third load threshold. In other words, the load management system 125 may determine whether causing the network repeater 105 to connect to the gNB 115-2 will cause the load of the gNB 115-2 to satisfy the third load threshold. If the network repeater 105 determines that the load of the network repeater 105 will cause the load of the gNB 115-2 to satisfy the third load threshold, the load management system 125 may determine whether a next base station (identified in the connectivity information of the network repeater 105) can establish a connection with the network repeater 105.

Based on determining that the load of the network repeater 105 will not cause the load of the gNB 115-2 to satisfy the third load threshold, the network repeater 105 may cause the network repeater 105 to connect to the gNB 115-2 to reduce the load of the gNB 115-1. In other words, the load management system 125 may cause the network repeater 105 to connect to the gNB 115-2 based on the load of the gNB 115-1 satisfying the first load threshold, the load of the network repeater 105, the network repeater 105 being capable of connecting to the gNB 115-2, and the load of the gNB 115-2. Accordingly, based on determining that the load of the gNB 115-1 satisfies the first load threshold, the load management system 125 may cause the network repeater 105 to connect to the gNB 115-2 in order to prevent the load of the gNB 115-1 from satisfying the second load threshold.

The gNB 115-1 may be configured to disconnect from one or more of the devices connected to the gNB 115-1 when the load of the gNB 115-1 satisfies the second load threshold.

In some implementations, the load management system 125 may cause the network repeater 105 to perform a handover operation to cause the network repeater 105 to connect to the gNB 115-2. The load management system 125 may cause information regarding the gNB 115-2 to be provided to the network repeater 105 to cause the network repeater 105 to connect to the gNB 115-2. The information regarding the network repeater 105 may include a physical cell identifier associated with the gNB 115-2 and a beam index associated with the gNB 115-2. In some examples, the information regarding the gNB 115-2 may allow the network repeater 105 to be automatically beam aligned and configured for attaching to the gNB 115-2.

In some examples, the information regarding the gNB 115-2 may further include master information block (MIB) data associated with the gNB 115-2, system information blocks (SIB) associated with the gNB 115-2, an absolute radio frequency (RF) channel number associated with the gNB 115-2, a band of operation (e.g., n260, n261, among other examples) associated with the gNB 115-2, time division duplex timing information associated with the gNB 115-2, periodicity, uplink symbols, downlink symbols, uplink slots, downlink slots, a slot format indicator, subcarrier offsets associated with the gNB 115-2, subcarrier spacings associated with the gNB 115-2, a physical cell identifier associated with the gNB 115-2, among other examples.

The information regarding the gNB 115-2 may further include information that causes the network repeater 105 to connect to the gNB 115-1 during a period of time between a downlink communication associated with the gNB 115-1 and an uplink communication associated with the gNB 115-1. In some implementations, the information regarding the gNB 115-2 may be provided via 4G connectivity.

After causing the network repeater 105 to connect to the gNB 115-2, the load management system 125 may cause the load information of the gNB 115-1 to be updated to indicate an updated load of the gNB 115-1. In some implementations, the load information may be updated using an API (e.g., a REST API). The load management system 125 may cause load information of the gNB 115-2 to be updated in a similar manner.

In some situations, after a period of time following the network repeater 105 connecting to the gNB 115-2, the load management system 125 may determine whether the network repeater 105 is to be reconnected to the gNB 115-1. For example, the load management system 125 may perform actions similar to the actions described above to determine whether the network repeater 105 is to be reconnected to the gNB 115-1 and to cause the network repeater 105 to be connected to the gNB 115-1 accordingly.

By causing the network repeater 105 to connect to the gNB 115-2 in this manner, the implementations described herein may prevent the load of the gNB 115-1 from reaching the maximum load and, accordingly, prevent the gNB 115-1 from being overloaded. As a result of preventing the gNB 115-1 from being overloaded, the implementations described herein may prevent the gNB 115-1 from disconnecting from one or more devices. By preventing the gNB 115-1 from disconnecting from the one or more devices, the implementations described herein may prevent poor network performance. Additionally, by preventing the gNB 115-1 from disconnecting from the one or more devices, the implementations described herein may preserve network resources, computing resources, and/or other resources that would been otherwise consumed in order to re-establish a connection with the gNB 115-1.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
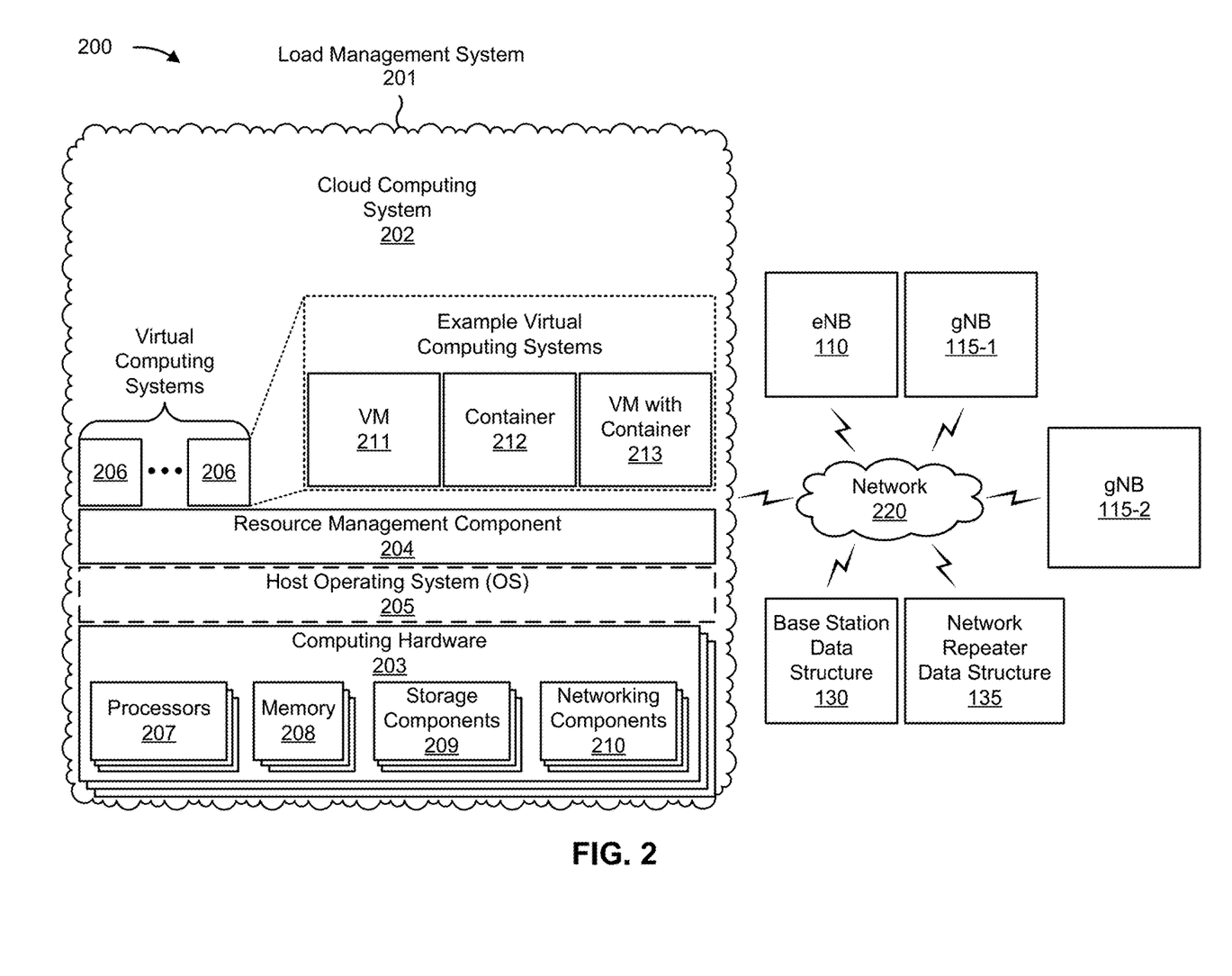
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a load management system 201, which may include one or more elements of and/or may execute within a cloud computing system 202. The cloud computing system 202 may include one or more elements 203-213, as described in more detail below. As further shown in FIG. 2, environment 200 may include a network 220, the eNB 110, the gNB 115-1, the gNB 115-2, the base station data structure 130, and/or the network repeater data structure 135. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the load management system 201 may include one or more elements 203-213 of the cloud computing system 202, may execute within the cloud computing system 202, and/or may be hosted within the cloud computing system 202, in some implementations, the load management system 201 may not be cloud-based (e.g., may be implemented outside of a cloud computing system) or may be partially cloud-based. For example, the load management system 201 may include one or more devices that are not part of the cloud computing system 202, such as device 300 of FIG. 3, which may include a standalone server or another type of computing device. The load management system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
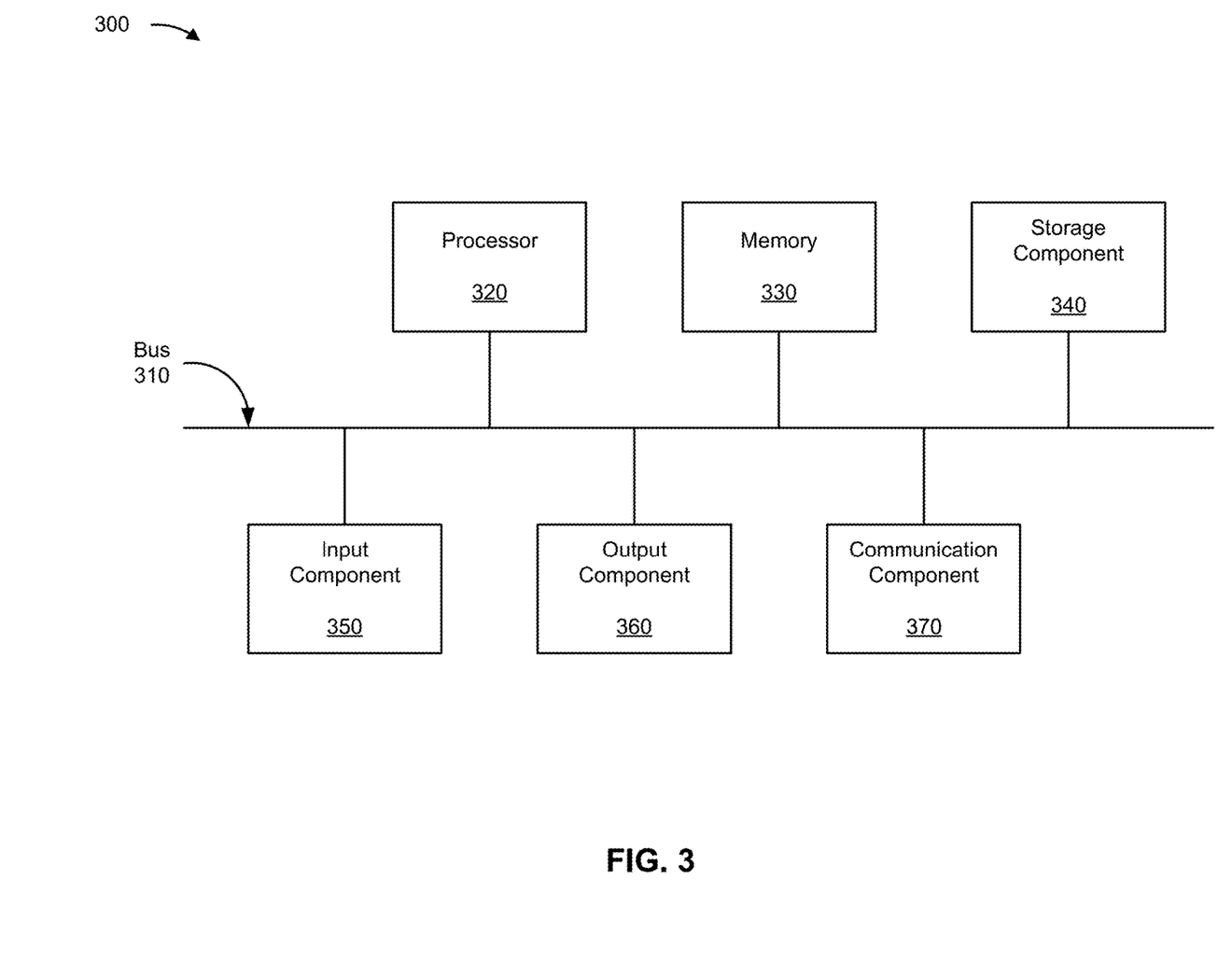
FIG. 3 is a diagram of example components of one or more devices of FIG. 2.

FIG. 3 is a diagram of example components of a device 300, which may correspond to the network repeater 105, the eNB 110, the gNB 115-1, and/or the gNB 115-2. In some implementations, the network repeater 105, the eNB 110, the gNB 115-1, and/or the gNB 115-2 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
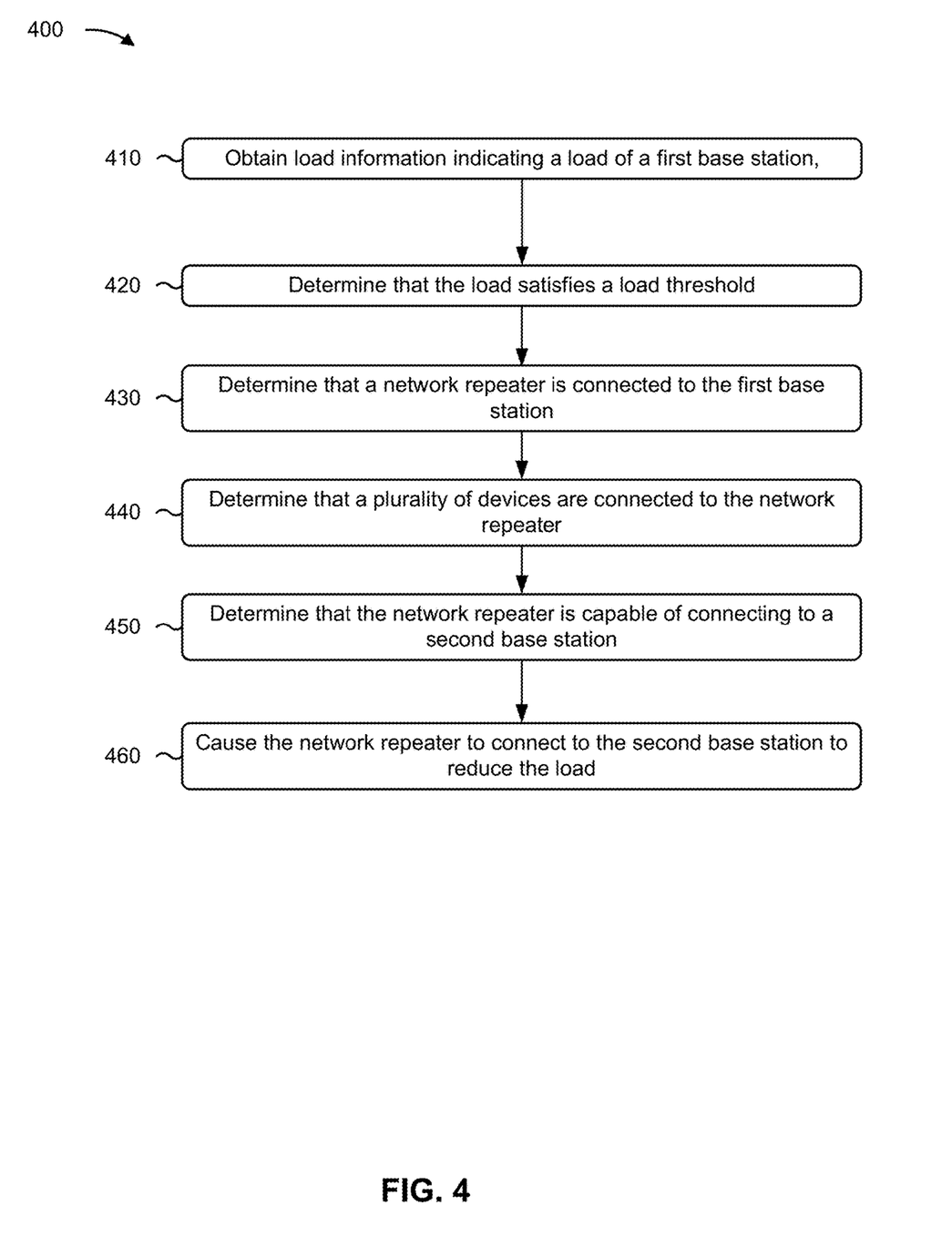
FIG. 4 is a flowchart of an example process relating to load balancing devices connected to a base station via a network repeater.

FIG. 4 is a flowchart of an example process 400 associated with systems and methods for load balancing devices. In some implementations, one or more process blocks of FIG. 4 may be performed by a device (e.g., the load management system 125). In some implementations, one or more process blocks of FIG. 4 may be performed by another device or a group of devices separate from or including the device, such as a the network repeater 105 (e.g., the network repeater 105r), a eNB (e.g., the eNB 110), and/or a gNB (e.g., the gNB 115-1 and/or the gNB 115-2). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining load information indicating a load of a first base station (block 410). For example, the device may obtain load information indicating a load of a first base station, wherein the load is associated with devices connected to the first base station, as described above. In some implementations, the load is associated with devices connected to the first base station.

As further shown in FIG. 4, process 400 may include determining that the load satisfies a load threshold of the first base station (block 420). For example, the device may determine that the load satisfies a load threshold of the first base station, as described above.

As further shown in FIG. 4, process 400 may include determining that a network repeater is connected to the first base station (block 430). For example, the device may determine that a network repeater is connected to the first base station, as described above.

In some implementations, determining that the network repeater is connected to the first base station comprises obtaining configuration information of the first base station, wherein the configuration information includes information identifying the devices connected to the first base station, and determining, based on the configuration information, that the devices include the network repeater.

As further shown in FIG. 4, process 400 may include determining that a plurality of devices are connected to the network repeater (block 440). For example, the device may determine that a plurality of devices are connected to the network repeater, as described above.

As further shown in FIG. 4, process 400 may include determining that the network repeater is capable of connecting to a second base station (block 450). For example, the device may determine that the network repeater is capable of connecting to a second base station, as described above.

In some implementations, determining that the network repeater is capable of connecting to the second base station comprises obtaining connectivity information of the network repeater, wherein the connectivity information includes first information identifying the first base station as a primary base station for the network repeater and second information identifying the second base station as a secondary base station for the network repeater, and determining that the network repeater is capable of connecting to the second base station based on the connectivity information.

As further shown in FIG. 4, process 400 may include causing the network repeater to connect to the second base station to reduce the load based on: (block 460). For example, the device may cause the network repeater to connect to the second base station to reduce the load based on: the load satisfying the load threshold, the plurality of devices being connected to the network repeater, and the network repeater being capable of connecting to the second base station, as described above.

In some implementations, causing the network repeater to connect to the second base station comprises causing the network repeater to connect to the second base station during a period of time between a downlink communication associated with the first base station and an uplink communication associated with the first base station.

In some implementations, process 400 includes receiving information indicating that the network repeater has connected to the second base station, and updating the load information to indicate an updated load of the first base station, after causing the network repeater to connect to the second base station.

In some implementations, the load of the first base station is a first load, and wherein causing the network repeater to connect to the second base station comprises determining a second load of the second base station, determining a load associated with devices connected to the network repeater, and causing the network repeater to connect to the second base station based on the second load of the second base station and the load associated with the devices.

In some implementations, the load threshold is a first load threshold, and wherein causing the network repeater to connect to the second base station comprises determining that the load, associated with the devices, does not cause the second load to satisfy a second load threshold of the second base station, and causing the network repeater to connect to the second base station based on determining that the load, associated with the quantity of devices, does not cause the second load to satisfy the second load threshold.

In some implementations, the network repeater is a first network repeater, the quantity of devices, connected to the first network repeater, is a first quantity of devices, and causing the network repeater to connect to the second base station comprises determining that a second network repeater is connected to the first base station; determining a second quantity of devices connected to the second network repeater; and determining whether to cause the first network repeater to connect to the second base station or cause the second network repeater to connect to the second base station based on a first total load associated with the first quantity of devices and a second total load associated with the second quantity of devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
 obtaining load information indicating a load of a first base station,
  wherein the load is associated with devices connected to the first base station;
 determining that the load satisfies a load threshold of the first base station;
 determining that a network repeater is connected to the first base station;
 determining that the network repeater is capable of connecting to a second base station;
 determining that a load of the network repeater exceeds a load of network repeaters connected to the first base station; and
 causing the network repeater to connect to the second base station to reduce the load based on:
  the load of the first base station satisfying the load threshold, the load of the network repeater exceeding the load of the network repeaters, a ranking of base stations that include the second base station, and the network repeater being capable of connecting to the second base station,
wherein the ranking is based on signals, from the base stations, received by the network repeater.

2. The method of claim 1, wherein causing the network repeater to connect to the second base station comprises:
determining that the network repeater is capable of being connected to a third base station;
determining that a first measure of signal quality, of the second base station, exceeds a second measure of signal quality of the third base station; and
causing the network repeater to connect to the second base station based on determining that the first measure of signal quality exceeds the second measure of signal quality,
wherein the base stations further include the third base station, and
wherein the second base station is ranked higher than the third base station based on the first measure of signal quality exceeding the second measure of signal quality.

3. The method of claim 1, further comprising:
receiving information indicating that the network repeater has connected to the second base station;
updating the load information to indicate an updated load of the first base station, after causing the network repeater to connect to the second base station;
determining, after a period time, whether the network repeater is to be reconnected to the first base station based on the updated load of the first base station; and
reconnecting the network repeater to the first base station based on determining whether the network repeater is to be reconnected to the first base station.

4. The method of claim 1, wherein determining that the network repeater is connected to the first base station comprises:
obtaining configuration information of the first base station,
wherein the configuration information includes information identifying the devices connected to the first base station; and
determining, based on the configuration information, that the devices include the network repeater.

5. The method of claim 1, wherein determining that the network repeater is capable of connecting to the second base station comprises:
obtaining connectivity information of the network repeater,
wherein the connectivity information includes first information identifying the first base station as a primary base station for the network repeater and second information identifying the second base station as a secondary base station for the network repeater; and
determining that the network repeater is capable of connecting to the second base station based on the connectivity information.

6. The method of claim 1, where the load of the first base station is a first load, and
wherein causing the network repeater to connect to the second base station comprises:
determining a second load of the second base station;
determining a load of the network repeater; and
causing the network repeater to connect to the second base station based on the second load of the second base station and the load of the network repeater.

7. The method of claim 6, wherein the load threshold is a first load threshold, and
wherein causing the network repeater to connect to the second base station comprises:
determining that the load, of the network repeater, does not cause the second load to satisfy a second load threshold of the second base station; and
causing the network repeater to connect to the second base station based on determining that the load, of the network repeater, does not cause the second load to satisfy the second load threshold.

8. A device, comprising:
a memory; and
one or more processors configured to:
determine that a load, of a first base station, satisfies a load threshold;
determine whether a network repeater is connected to the first base station,
wherein a plurality of devices are connected to the network repeater;
determine whether the network repeater is capable of being connected to a second base station based on determining that the first base station is connected to the network repeater;
determine whether a load of the network repeater exceeds a load of network repeaters connected to the first base station; and
cause the network repeater to connect to the second base station to reduce the load when:
the load of the first base station satisfies the load threshold,
the network repeater is capable of being connected to the second base station,
a ranking of base stations that include the second base station, and
the load of the network repeater exceeds the load of the network repeaters,
wherein the ranking is based on signals, from the base stations, received by the network repeater.

9. The device of claim 8, wherein the plurality of devices is a first plurality of devices,
wherein the load threshold is a first load threshold,
wherein the first base station is connected to a second plurality of devices, and
wherein the one or more processors, to cause the network repeater to connect to the second base station, are configured to:
cause the network repeater to connect to the second base station to reduce the load of the first base station to prevent the load of the first base station from satisfying a second load threshold that exceeds the first load threshold,
wherein the first base station is configured to disconnect from one or more of the second plurality of devices when the load of the first base station satisfies the second load threshold.

10. The device of claim 8, wherein the one or more processors, to cause the network repeater to connect to the second base station, are configured to:
determine a quantity of devices connected to the network repeater;
determine that the quantity of devices causes the load of the first base station to satisfy the load threshold; and cause the network repeater to connect to the second base station based on determining that the quantity of devices causes the load of the first base station to satisfy the load threshold.

11. The device of claim 8, wherein the one or more processors are further configured to:
   determine that the network repeater is capable of being connected to a third base station;
   determine that a first measure of signal quality, of the second base station, exceeds a second measure of signal quality of the third base station; and
   cause the network repeater to connect to the second base station based on determining that the first measure of signal quality exceeds the second measure of signal quality.

12. The device of claim 8, wherein the network repeater is a first network repeater,
   wherein the one or more processors, to cause the network repeater to connect to the second base station, are configured to:
      determine a first quantity of devices connected to the network repeater;
      determine that a second network repeater is connected to the first base station;
      determine a second quantity of devices connected to the second network repeater; and
      determine whether to cause the first network repeater to connect to the second base station or cause the second network repeater to connect to the second base station based on a first total load associated with the first quantity of devices and a second total load associated with the second quantity of devices.

13. The device of claim 12, wherein the one or more processors, to cause the network repeater to connect to the second base station, are configured to:
   determine that the first total load exceeds the second total load; and
   cause the first network repeater to connect to the second base station based on determining that the first total load exceeds the second total load.

14. The device of claim 8, wherein the one or more processors, to cause the network repeater to connect to the second base station, are configured to:
   cause information regarding the second base station to be provided to the network repeater,
      wherein the information regarding the second base station includes a physical cell identifier associated with the second base station and a beam index associated with the second base station.

15. A non-transitory computer-readable medium storing a set of instructions, the set of instructions comprising:
   one or more instructions that, when executed by one or more processors of a device, cause the device to:
      determine that a first load, of a first base station, satisfies a load threshold;
      determine that a network repeater is connected to the first base station;
      determine a second load associated with devices connected to the network repeater; and
      cause the network repeater to connect to a second base station to reduce the first load based on:
         the second load exceeding a load of network repeaters connected to the first base station, and
         a ranking of base stations that include the second base station,
            wherein the ranking is based on at least one of:
               signal strengths of signals, from the base stations, received by the network repeater, or
               signal qualities of the signals, from the base stations, received by the network repeater.

16. The non-transitory computer-readable medium of claim 15, wherein the one or more instructions, when executed by the one or more processors, further cause the device to:
   determine that the network repeater is capable of being connected to the second base station; and
   cause the network repeater to connect to the second base station further based on determining that the network repeater is capable of being connected to the second base station.

17. The non-transitory computer-readable medium of claim 15, wherein the one or more instructions, that cause the device to cause the network repeater to connect to the second base station, cause the device to:
   cause information regarding the second base station to be provided to the network repeater,
      wherein the information regarding the first base station includes information identifying the second base station and information identifying a beam associated with the second base station.

18. The non-transitory computer-readable medium of claim 15, wherein the network repeater is a first network repeater, and
   wherein the one or more instructions, when executed by the one or more processors, further cause the device to:
      determine that the first load does not satisfy the load threshold after causing the network repeater to connect to the second base station;
      determine a third load associated with devices connected to a second network repeater; and
      cause the second network repeater to be connected to the first base station based on determining that the first load does not satisfy the load threshold and based on the third load.

19. The non-transitory computer-readable medium of claim 15, wherein the one or more instructions, when executed by the one or more processors, further cause the device to:
   determine that the network repeater is capable of being connected to a third base station;
   determine that a first measure of signal quality, of the second base station, exceeds a second measure of signal quality of the third base station; and
   cause the network repeater to connect to the second base station based on determining that the first measure of signal quality exceeds the second measure of signal quality.

20. The non-transitory computer-readable medium of claim 15, wherein the load threshold is a first load threshold,
   wherein the first base station is connected to a plurality of devices, and
   wherein the one or more instructions, that cause the device to cause the network repeater to connect to the second base station, cause the device to:
      cause the network repeater to connect to the second base station to reduce the first load to prevent the first load from satisfying a second load threshold that exceeds the first load threshold,
         wherein the first base station is configured to disconnect from one or more of the plurality of devices when the first load satisfies the second load threshold.

* * * * *